No. 644,168. Patented Feb. 27, 1900.
C. E. GIBBS.
FRUIT PICKER.
(Application filed May 17, 1899.)
(No Model.)
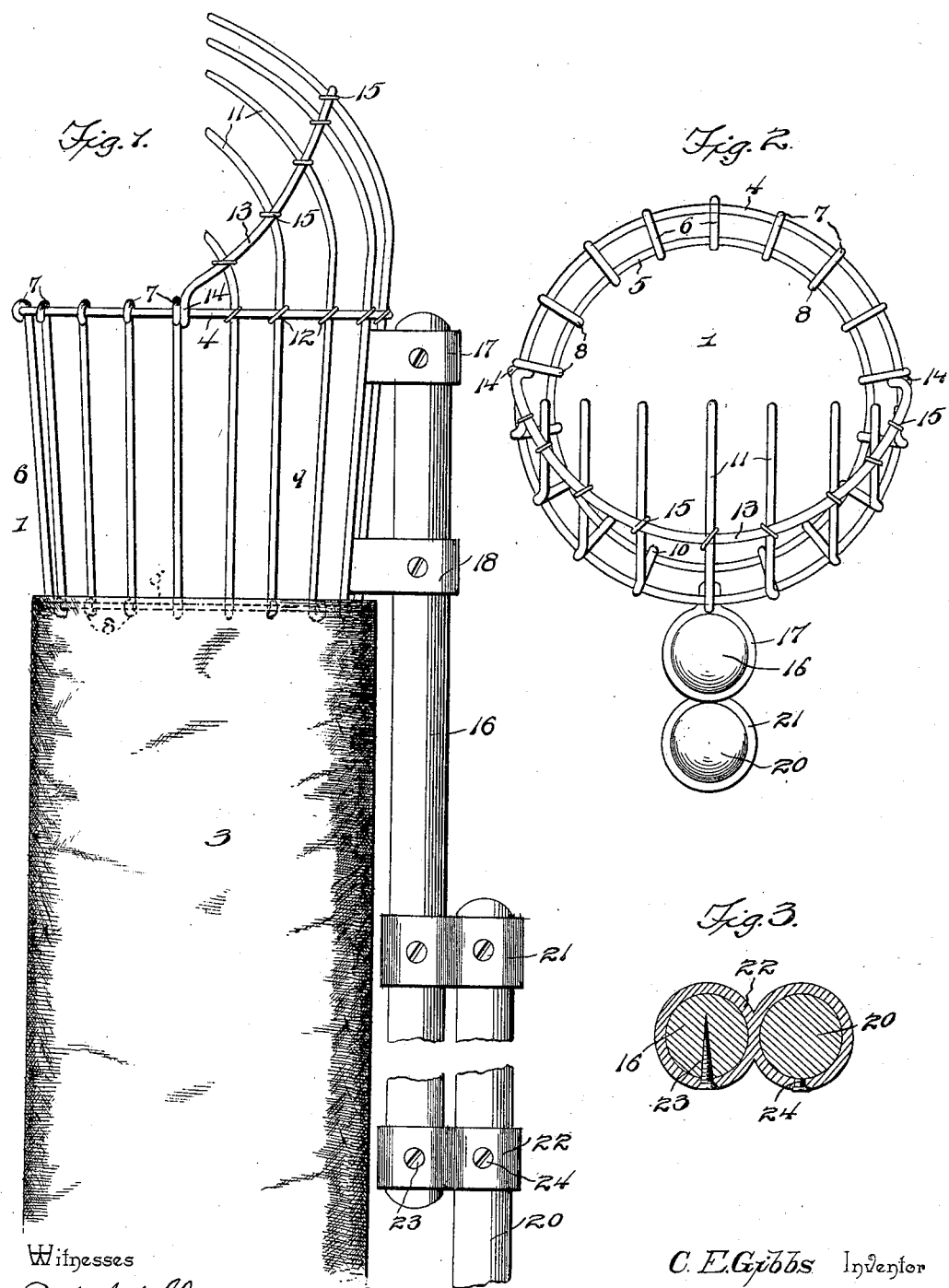

UNITED STATES PATENT OFFICE.

CHARLES E. GIBBS, OF ORANGE, MASSACHUSETTS.

FRUIT-PICKER.

SPECIFICATION forming part of Letters Patent No. 644,168, dated February 27, 1900.

Application filed May 17, 1899. Serial No. 717,194. (No model.)

*To all whom it may concern:*

Be it known that I, CHARLES E. GIBBS, a citizen of the United States, residing at Orange, in the county of Franklin and State of Massachusetts, have invented a new and useful Fruit-Picker, of which the following is a specification.

The invention relates to improvements in fruit-pickers.

The object of the present invention is to improve the construction of fruit-pickers and to provide a simple, inexpensive, and efficient device capable of enabling fruit to be rapidly gathered and delivered to a basket or other receptacle without bruising the said fruit.

The invention consists in the construction and novel combination and arrangement of parts hereinafter fully described, illustrated in the accompanying drawings, and pointed out in the claim hereto appended.

In the drawings, Figure 1 is a side elevation of a portion of a fruit-picker constructed in accordance with this invention. Fig. 2 is a plan view of the bottomless wire basket which forms the head of the fruit-picker. Fig. 3 is a detail sectional view illustrating the means for adjustably connecting the sections of the pole.

Like numerals of reference designate corresponding parts in all the figures of the drawings.

1 designates a bottomless wire basket forming the head of the fruit-gatherer and connected at the lower edges of its sides to a flexible chute 3, which is adapted to conduct the fruit from the head to a basket or other suitable receptacle without bruising the said fruit. The head consists of an annular series of wires connected by upper and lower rings 4 and 5, the lower ring being suitably secured to the upper end of the chute. The front wires 6 are provided at their upper and lower ends with eyes 7 and 8, through which pass the upper and lower rings, and the rear wires 9, which are provided at their lower ends with eyes 10 to receive the lower ring, are secured to and extended above the upper ring to provide fruit-engaging fingers 11. The wires at the back of the head may be secured to the upper ring by wire ties or fasteners 12, and the extended portions are supported by a curved brace 13, having its terminals 14 coiled around the top wire and secured to the said extensions by fasteners 15, similar to the fasteners 12. The sides of the curved brace are inclined, and the projecting portions or fingers are spaced apart to receive the stems of fruit between them, and they are adapted to free the fruit from a tree without bruising or otherwise injuring the former.

The basket or head is secured to the upper section 16 of a pole by clips 17 and 18, and the said pole, which is extensible to enable the fruit-picker to be readily adjusted to suit the height of the tree to be picked, is composed of said upper section 16 and the lower section 20, slidingly connected thereto by means of the bands 21 and 22. Each band is composed of two circular portions or collars arranged as clearly shown in Fig. 1. The lower connecting device or band 22 is fixed to the lower end of the upper section 16 by a screw 23 or other suitable fastening device and is adjustably secured to the lower section by a clamping-screw 24. The upper connecting device or band 21 is fixed to the upper end of the lower section and is adjustably secured to the upper section, it being arranged the reverse of the lower connecting device or band 22. This construction permits the pole to be lengthened or shortened, and, if desired, more than two sections may be employed, and the said sections may be made any desired length. As the clips 17 and 18, which are secured to one of the rear wires, are spaced apart and located between the inner and outer rings at points close to the same, the head will be prevented from slipping materially inward and outward on the handle when the device is in use, as would be the case were only one clip employed.

It will be seen that the wire basket or head is simple and comparatively inexpensive in construction and that while it is adapted to rapidly gather fruit it will not bruise or otherwise injure the same. The curved brace, which connects and supports the projecting portions of the wires, is arranged on the exterior of the same, and the fruit-engaging portion, which is curved forward over the rear half of the head, is more or less resilient and presents smooth surfaces to the fruit.

By securing the brace to the projecting portions substantially medially of their respective curves there is not so much danger of the fingers being bent or damaged, as the brace will prevent their being bent outwardly too far, and by providing that end of each of the wires forming the head with an eye the wires are held against axial rotation without the use of recessed bands and solder.

Changes in the form, proportion, size, and the minor details of construction within the scope of the appended claim may be resorted to without departing from the spirit or sacrificing any of the advantages of this invention.

What is claimed is—

In a fruit-picker, the combination with an approximately-cylindrical chute, of a substantially-cylindrical head comprising inner and outer rings, the inner rings being secured to the upper or outer end of the chute, a series of wires disposed longitudinally and connecting the inner and outer rings, the rear wires being extended beyond the outer ring and curved, and the curved brace crossing the extended portions of the rear wires and secured to the same and to the outer ring, and the handle provided at its outer end with a pair of clips spaced apart and secured to one of the rear wires and located between the inner and outer rings close to the same in position to be engaged by the said rings, whereby the head will be prevented from slipping materially inward and outward on the handle when the fruit-picker is in use, substantially as described.

In testimony that I claim the foregoing as my own I have hereto affixed my signature in the presence of two witnesses.

CHARLES E. GIBBS.

Witnesses:
 FRANCIS H. MARKOE,
 ALBERT F. ROBBINS.